(12) United States Patent
Parann-Nissany et al.

(10) Patent No.: US 9,660,805 B2
(45) Date of Patent: May 23, 2017

(54) METHODS AND DEVICES FOR SECURING KEYS WHEN KEY-MANAGEMENT PROCESSES ARE SUBVERTED BY AN ADVERSARY

(71) Applicant: Porticor Ltd., Hod Hasharon (IL)

(72) Inventors: Gilad Parann-Nissany, Ramat Hasharon (IL); Yaron Sheffer, Tel Aviv (IL); Alon Rosen, Tel Aviv (IL)

(73) Assignee: Porticor Ltd., Hod Hasharon ( * ) Notice: Subject to any disclaimer, the term of this patent is extended or adjusted under 35 U.S.C. 154(b) by 48 days.

(21) Appl. No.: 14/711,369

(22) Filed: May 13, 2015

(65) Prior Publication Data

US 2015/0333905 A1   Nov. 19, 2015

Related U.S. Application Data

(60) Provisional application No. 61/992,935, filed on May 14, 2014.

(51) Int. Cl.
| | |
|---|---|
| *H04L 9/08* | (2006.01) |
| *H04L 29/06* | (2006.01) |
| *H04L 9/00* | (2006.01) |
| *H04L 9/32* | (2006.01) |

(52) U.S. Cl.
CPC .......... *H04L 9/0861* (2013.01); *H04L 9/0819* (2013.01); *H04L 63/062* (2013.01); *H04L 9/008* (2013.01); *H04L 9/3221* (2013.01)

(58) Field of Classification Search
CPC .................................................. H04L 9/0861
USPC .......................................................... 380/44
See application file for complete search history.

(56) References Cited

U.S. PATENT DOCUMENTS

2003/0039358 A1* 2/2003 Scheidt ................ H04L 9/0869
380/47

OTHER PUBLICATIONS

U.S. Appl. No. 13/820,815, filed Mar. 5, 2013, Porticor Ltd.
U.S. Appl. No. 13/890,274, filed May 9, 2013, Porticor Ltd.

* cited by examiner

*Primary Examiner* — Jacob Lipman
(74) *Attorney, Agent, or Firm* — Reuven K. Mouallem; FlashPoint IP Ltd.

(57) ABSTRACT

The present invention discloses methods and devices for securing keys when key-management processes are subverted by an adversary. Methods include the steps of: upon receiving a creation request in the computing-environment, creating a secure key in at least one location in a computing environment by repetitively computing respective secure-key contributions: in at least one location; and in a set of N computing resources in the computing environment, wherein N is a non-negative integer; and applying the respective secure-key contributions to change a secure-key value, wherein: the respective secure-key contributions cannot be omitted or modified by at least one location; and the secure key is never revealed to the computing resources; thereby enabling the computing resources in the computing environment to ensure that the secure key is truly random; wherein at least one location is a region of memory located in a computing resource operationally connected to the computing-environment.

15 Claims, 6 Drawing Sheets

Exemplary Embodiment

Exemplary Embodiment

METHODS AND DEVICES FOR SECURING KEYS WHEN KEY-MANAGEMENT PROCESSES ARE SUBVERTED BY AN ADVERSARY

CROSS REFERENCE TO RELATED APPLICATIONS

This patent application claims priority under 35 U.S.C. §119(e) to U.S. Provisional Patent Application No. 61/992,935, filed May 14, 2014, which is hereby incorporated by reference in its entirety.

FIELD AND BACKGROUND OF THE INVENTION

The present invention relates to methods and devices for securing keys when key-management processes are subverted by an adversary, with applications to distributed environments.

A trend in modern computer networking, web-, and cloud-computing, is to rely on public, group, shared, or virtualized resources. The IT (information technology) marketplace offers public, private, and hybrid solutions for "virtualization" and "cloud computing." Such a growing trend is occurring at many levels: infrastructure, platform, and software.

A recurring problem hampering such solutions is the fact that "networked," "virtualized," and/or "cloud" solutions are by their very nature non-secured and distributed. The resources may be physically owned by different entities other than the users, or may be shared among multiple users (having existing security, privacy, and trust concerns). This may occur within one legal entity or among different entities.

For example, a file may be saved in a network "storage cloud." Since the storage cloud is a shared resource, a user is entrusting his/her data to a resource that is routinely accessed by many other users, over which the user has no control at all.

All modern computing systems share a concern that malicious attackers may breach the security of an environment and obtain some of its secrets. This general concern is even greater in public, group, virtualized or network-accessible environments—since the scope for an attacker to enter the system is commensurately greater.

Of course, one solution for the security-conscious consumer is to avoid shared resources altogether. However, such an option is an unpleasant choice for the user, since modern shared resources provide many economic, operational, and technical benefits.

It would be desirable to have methods and devices for securing keys when key-management processes are subverted by an adversary. Such methods and devices would, inter alia, overcome the limitations mentioned above.

SUMMARY

It is the purpose of the present invention to provide methods and devices for securing keys when key-management processes are subverted by an adversary, with applications to distributed environments.

It is noted that the term "exemplary" is used herein to refer to examples of embodiments and/or implementations, and is not meant to necessarily convey a more-desirable use-case. Therefore, it is understood from the above that "exemplary" may be applied herein to multiple embodiments and/or implementations.

Embodiments of the present invention enable the security-conscious customer to use available shared or distributed resources, and yet enjoy full security and control—with emphasis placed on key management.

"Keys" in this context may be any secret that can be called a key, as the term is used in the art, or indeed any secret phrase. The term "protected item" is also used to denote such secrets. Common examples would be the encryption key that is used to encrypt a large amount of data, or the access key that is used to gain access to a computing subsystem.

Assume that a key may be legitimately used by several entities in an environment (each is called an "appliance"); some of the appliances may create the key, while other appliances may use the key. Each such creation operation or usage operation may in principal be performed by the same or a different entity.

Also, the appliances are in communication with a Protected Virtual Key Manager (PVKM) which may provide services to the abovementioned appliances and to the users of the system. Such services are related to managing the keys of the system, and also related to enhancing the security of the system.

It is desirable that:
  if the data and/or runtime state of an appliance is compromised, or even if its code is replaced with malicious or buggy code, no keys are leaked;
  if the data and/or runtime state of the PVKM is compromised, or even if its code is replaced with malicious or buggy code, no keys are leaked; and
  if an attacker obtains a key present on one appliance, it still cannot obtain similar keys present on another appliance.

One way to protect keys is by encrypting the keys with a "key-encryption key," also called a "master key." But then the above requirements translate to requirements about the security of the master key. If data, the runtime state, or code is compromised, the master key must not be leaked.

In the interest of clarity, the terms "compromise" and "subversion" are specifically defined for use herein. One possible definition, which is used herein, is that the adversarial model is "semi honest." In the semi-honest model as used herein, it is assumed that the computing entities (i.e., appliances and PVKM) have been implemented as specified, and the computing platform, on which such entities are implemented, actually runs the entities as implemented. In such a semi-honest model, an attacker may eavesdrop, but, by assumption, does not change such implementations.

A more stringent definition is that the security of the system, and in particular the security of a master key, is not compromised even if an attacker is able to arbitrarily deviate from the prescribed implementation (e.g., for an appliance or the PVKM). Such an adversarial model is referred to herein as the "malicious" model.

In such a malicious model, it is assumed that attackers may have taken over an appliance, or the PVKM, and changed its implementation arbitrarily, so that one or more entities (i.e., appliances or the PVKM) are now "malicious." Security of the master key in such a malicious model means that the attackers will still never discover the master key, even when the attackers control malicious entities.

Embodiments of the present invention are resilient to subversion, even if an adversary has arbitrarily modified the implementation of an appliance or the implementation of the PVKM. Such embodiments are well-adapted to modern public, group, virtualized, or network-accessible environments.

Such distributed environments may involve situations were legitimate computing entities are joining and leaving a system all the time. Embodiments of the present invention are resilient to the compromise of key-management processes without depending on specific pieces of hardware but rather depending on algorithms or software that can be easily deployed to members of such a dynamic environment.

Therefore, according to the present invention, there is provided for the first time a method for securing keys when key-management processes are subverted by an adversary, the method including the steps of: (a) upon receiving a creation request in the computing-environment, creating a secure key in at least one location in a computing environment by repetitively computing respective secure-key contributions: (i) in at least one location; and (ii) in a set of N computing resources in the computing environment, wherein N is a non-negative integer; and (b) applying the respective secure-key contributions to change a secure-key value, wherein: (i) the respective secure-key contributions cannot be omitted or modified by at least one location; and (ii) the secure key is never revealed to the computing resources; thereby enabling the computing resources in the computing environment to ensure that the secure key is truly random; wherein at least one location is a region of memory located in a computing resource operationally connected to the computing-environment.

Alternatively, the respective secure-key contributions are random.

Alternatively, the respective secure-key contributions of the set of N computing resources are never revealed to at least one location.

Alternatively, a given, respective secure-key contribution of a given computing resource is never revealed to any other computing resource of the set of N computing resources, and wherein the secure-key in at least one location is never revealed to any other computing resource of the set of N computing resources.

Alternatively, the step of creating and the step of applying the respective secure-key contributions can be performed on any element of a collection of computing resources operationally connected to the computing-environment, and wherein the step of applying is performed differently on each element, thereby preventing subversion of one element from compromising any other element.

According to the present invention, there is provided for the first time a device for securing keys when key-management processes are subverted by an adversary, the device including: (a) a server including: (i) a CPU for performing computational operations; (ii) a memory module for storing data; and (iii) a network connection for communicating across a network; and (b) a protection module, residing on the server, configured for: (i) upon receiving a creation request in the computing-environment, creating a secure key in at least one location in a computing environment by repetitively computing respective secure-key contributions: (A) in at least one location; and (B) in a set of N computing resources in the computing environment, wherein N is a non-negative integer; and (ii) applying the respective secure-key contributions to change a secure-key value, wherein: (A) the respective secure-key contributions cannot be omitted or modified by at least one location; and (B) the secure key is never revealed to the computing resources; thereby enabling the computing resources in the computing environment to ensure that the secure key is truly random; wherein at least one location is a region of memory located in a computing resource operationally connected to the computing-environment.

Alternatively, the respective secure-key contributions are random.

Alternatively, the respective secure-key contributions of the set of N computing resources are never revealed to at least one location.

Alternatively, a given, respective secure-key contribution of a given computing resource is never revealed to any other computing resource of the set of N computing resources, and wherein the secure-key in at least one location is never revealed to any other computing resource of the set of N computing resources.

Alternatively, the creating and the applying the respective secure-key contributions can be performed on any element of a collection of computing resources operationally connected to the computing-environment, and wherein the applying is performed differently on each element, thereby preventing subversion of one element from compromising any other element.

According to the present invention, there is provided for the first time a non-transitory computer-readable medium, having computer-readable code embodied on the non-transitory computer-readable medium for securing keys when key-management processes are subverted by an adversary, the computer-readable code including: (a) program code for, upon receiving a creation request in the computing-environment, creating a secure key in at least one location in a computing environment by repetitively computing respective secure-key contributions: (i) in at least one location; and (ii) in a set of N computing resources in the computing environment, wherein N is a non-negative integer; and (b) program code for, applying the respective secure-key contributions to change a secure-key value, wherein: (i) the respective secure-key contributions cannot be omitted or modified by at least one location; and (ii) the secure key is never revealed to the computing resources; thereby enabling the computing resources in the computing environment to ensure that the secure key is truly random; wherein at least one location is a region of memory located in a computing resource operationally connected to the computing-environment.

Alternatively, the respective secure-key contributions are random.

Alternatively, the respective secure-key contributions of the set of N computing resources are never revealed to at least one location.

Alternatively, a given, respective secure-key contribution of a given computing resource is never revealed to any other computing resource of the set of N computing resources, and wherein the secure-key in at least one location is never revealed to any other computing resource of the set of N computing resources.

Alternatively, the creating and the applying the respective secure-key contributions can be performed on any element of a collection of computing resources operationally connected to the computing-environment, and wherein the applying is performed differently on each element, thereby preventing subversion of one said element from compromising any other element.

These and further embodiments will be apparent from the detailed description that follows.

BRIEF DESCRIPTION OF THE DRAWINGS

The present invention is herein described, by way of example only, with reference to the accompanying drawings, wherein.

DESCRIPTION OF THE ILLUSTRATED EMBODIMENTS

Figure 1:
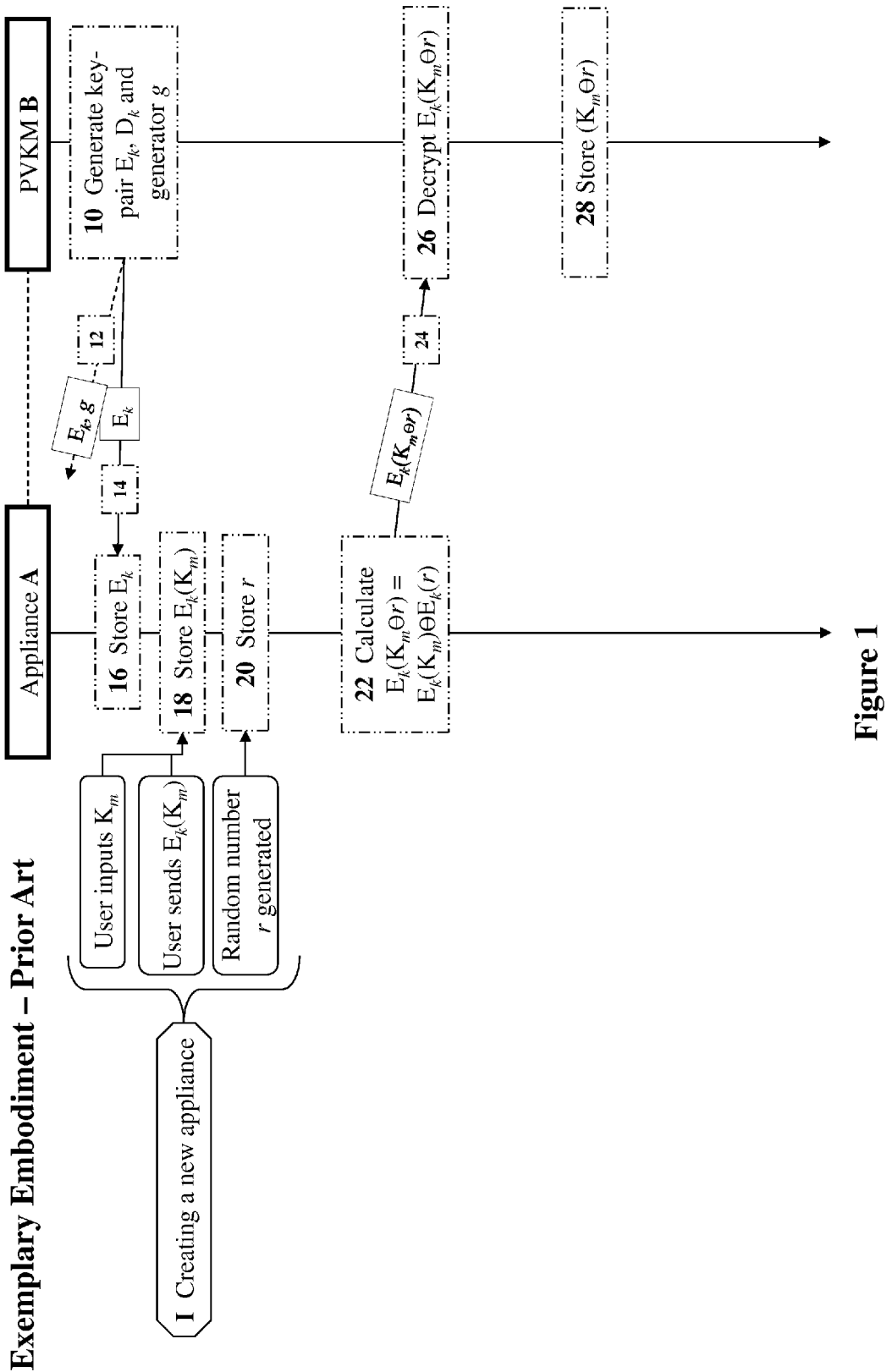
FIG. 1 is a simplified high-level block diagram of the scheme of major operational steps in an exemplary implementation for creating a new appliance of securing keys in a "semi-honest" model, according to the prior art.

The present invention relates to methods and devices for securing keys when key-management processes are subverted by an adversary, with applications to distributed environments. The principles and operation for providing such methods and devices, according to the present invention, may be better understood with reference to the accompanying description and the drawings.

Consider a computing system (e.g., a software application) that includes multiple computing resources. Such resources may be defined broadly (e.g., data, secret phrases, keys, memory segments, storage areas, storage segments, networks, network segments, and computing resources. Some or all of such resources are protected by keys. It is required to use a master key (a "key-encryption key") to secure some of the keys in the system. Since the master key is required to secure other keys in the system, it must be secured itself.

Since the security of the computing system is a concern, ideally the master key would be secured by keeping the key in a safe place, outside the computing system (or indeed, outside any computing system). At the same time, since the master key is needed to secure resources in the computing system, the master key must be inside the computing system.

Ideally, the master key could be used inside the computing system without ever having the key inside the computing system (or inside any computing system). Such a statement is not paradoxical, since such an objective may be achieved by employing methods that encrypt the key before the key enters any computing system, while performing the encryption in ways that still allow the key to be used.

Assume some key $K_m$ is used to protect another key, $K_s$, in the system. $K_m$ is the "master" key and $K_s$ a "specific" key. The encryption of $K_s$ by $K_m$ is denoted as:

$$K_m \ominus K_s \qquad \text{Equation 1,}$$

which is referred to as the "blinding" of $K_s$ with $K_m$, and in which $\ominus$ is a suitable operator. The inverse of $\ominus$ is "/" (sometimes represented by the symbol "÷"), so the decryption operation is $(K_m \ominus K_s)/K_m$.

As mentioned, $K_m$ itself needs to be protected. $K_m$ is encrypted using an encryption method denoted as $E(K_m)$, and the decryption can be denoted D, so that $D(E(K_m))=K_m$.

In order to satisfy that $K_m$ is never inside the computing environment (in its plain, unencrypted form), the encryption E is applied before $K_m$ enters the computing environment. Thus, $K_m$ is never in the computing environment, rather only $E(K_m)$ is.

In order for $K_m$ to be used to protect $K_s$, it is necessary to select E, D, $\ominus$, and / such that:

$$E(K_m) \ominus E(K_s) = E(K_m \ominus K_s) \qquad \text{Equation 2a,}$$

$$\text{and } D(K_m \ominus K_s) = D(K_m) \ominus D(K_s) \qquad \text{Equation 2b.}$$

Equations 2a and 2b are referred to as the "homomorphic" property of the method. Note that such a homomorphic property implies that $\ominus$ may be applied to $K_s$ even while $K_m$ and $K_s$ are in an encrypted form, encrypted by E. Therefore, the requirement of protecting $K_s$ with $K_m$, without ever knowing $K_m$, is satisfied—only the "homomorphic encryption" of the master key is known in the system, never the master key itself.

Similar relations may be defined for the inverse operator "/" in order for the "unblinding" of $K_s$ (i.e., the decryption in relation to the blinding with $\ominus$) to be performed even while both $K_m$ and $K_s$ are encrypted with E. The technique of protecting the master key $K_m$ while allowing $K_m$ to be used is referred to as "homomorphic key encryption."

Another way to protect master key $K_m$ is to apply the blinding operation $\ominus$ to $K_m$ itself as follows.

$$r \ominus K_m \qquad \text{Equation 3,}$$

in which r is some suitable value. We will sometimes use a random value r in such a blinding, so this would be called a "random blinding." In some embodiments of the present invention, a combination of random blinding and homomorphic key encryption is employed.

Generalizing such an approach, different entities (i.e., appliances) in the system may use different encryption (e.g., $E_1, E_2, \ldots$) to protect the master key. Such a feature practically means that stealing the encrypted form from one entity will not help a thief anywhere else in the system. The homomorphic property is therefore generalized as:

$$E_k(K_m) \ominus E_k(K_s) = E_k(K_m \ominus K_s) \qquad \text{Equation 4a,}$$

$$\text{and } D_k(K_m \ominus K_s) = D_k(K_m) \ominus D_k(K_s) \qquad \text{Equation 4b,}$$

with similar relations defined for the inverse "/" operator. Thus, the methodology enables:

1) $K_m$ to never be inside the computing environment (in its plain form);
2) $K_m$ to be used to protect secrets, such as the specific keys $K_s$, without being known—never becoming exposed to any entity in the computing environment;
3) the preserving of secrecy and authenticity of master key $K_m$ and the specific keys with respect to the PVKM;
4) the preserving of secrecy and authenticity of master key $K_m$ and the specific keys with respect to all appliance instances; and
5) the preserving of secrecy and authenticity of master key $K_m$ and specific keys with respect to an "eavesdropper."

Examples of practical choices for E, D, ⊖, and "/" may include:
- ElGamal encryption and decryption, with the blinding achieved by multiplication and division modulus of a prime number;
- Paillier encryption and decryption, with the blinding achieved by addition and subtraction;
- RSA encryption and decryption, with the blinding achieved by multiplication modulus and division modulus of a prime number; and
- Goldwasser-Micali encryption and decryption, with the blinding achieved by XOR.

In the discussion below, the PVKM may be viewed as a "location" (whether physical or virtual) in such an environment, while each appliance and other security element may be viewed as another "location" (whether physical or virtual). However, for the avoidance of doubt, the PVKM itself may be implemented as a collection or a cluster; we will still refer to it as a location for the sake of simplicity.

Referring to the drawings, In FIG. 1, as well as subsequent FIGS. 2-6, the overall process has been depicted according to separate, sequential time lines (going from top to bottom in the drawings) for two primary generalized components, an appliance A and a PVKM B, in order to representationally isolate the parallel processes that are occurring on each component independently.

It is noted that appliance A is intended to be a simplified example of a plurality of appliances in order to provide clarity in the description. It is understood that the present invention has broader applicability to a collection or cluster of such appliances. Furthermore, PVKM B is intended to be one conceptual entity (e.g., a server); however, in practical implementations, PVKM B may be a plurality of entities (e.g., a cluster of servers for fail-over protection). In generalizations of this approach, there may be more locations, and therefore more timelines (as in FIG. 6).

Figure 4:
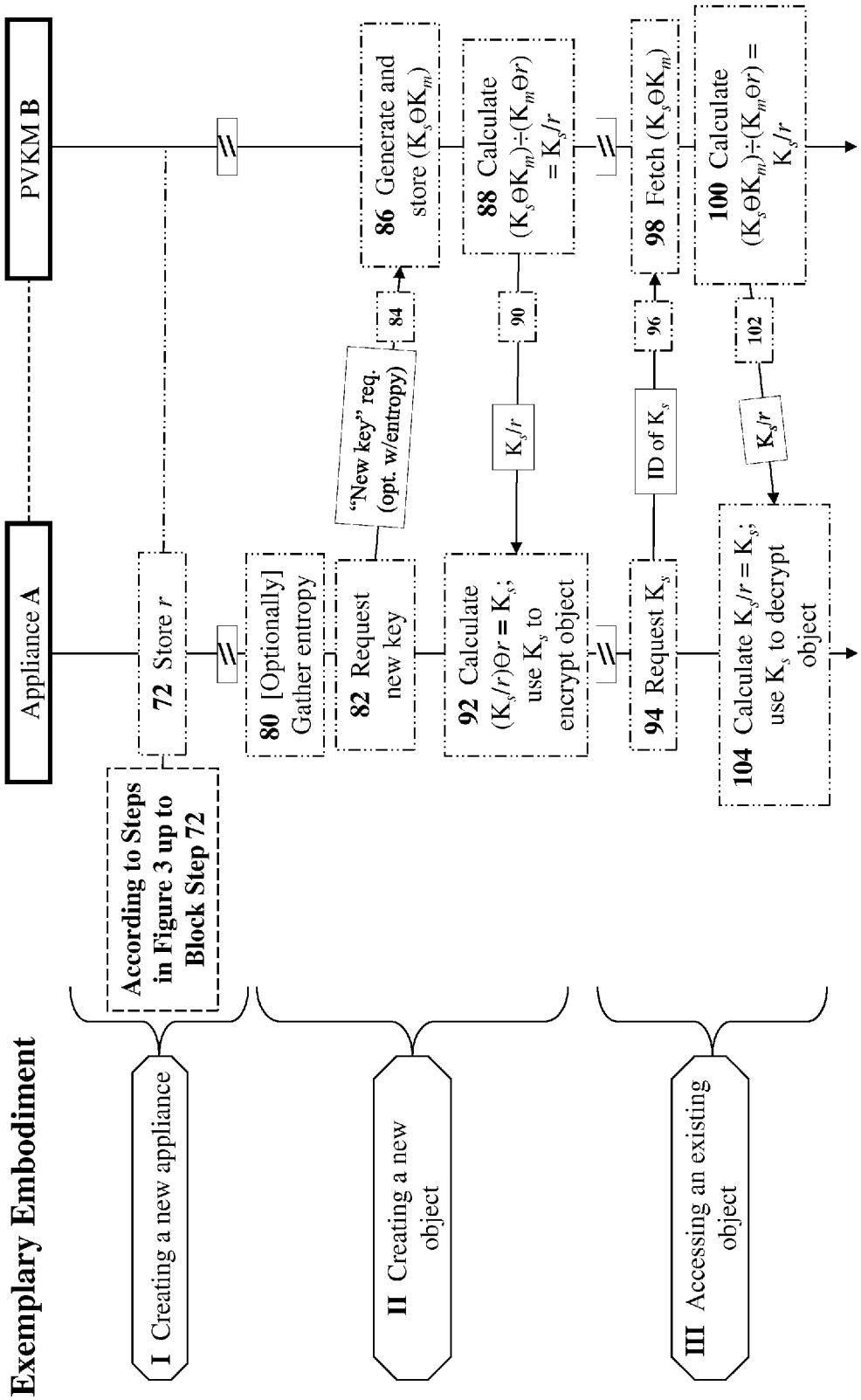
FIG. 4 is a simplified high-level block diagram of the scheme of major operational steps in an exemplary implementation of a homomorphic key encryption protocol utilizing the zero-knowledge proof to provide secure keys for objects, according to embodiments of the present invention.
Figure 5:
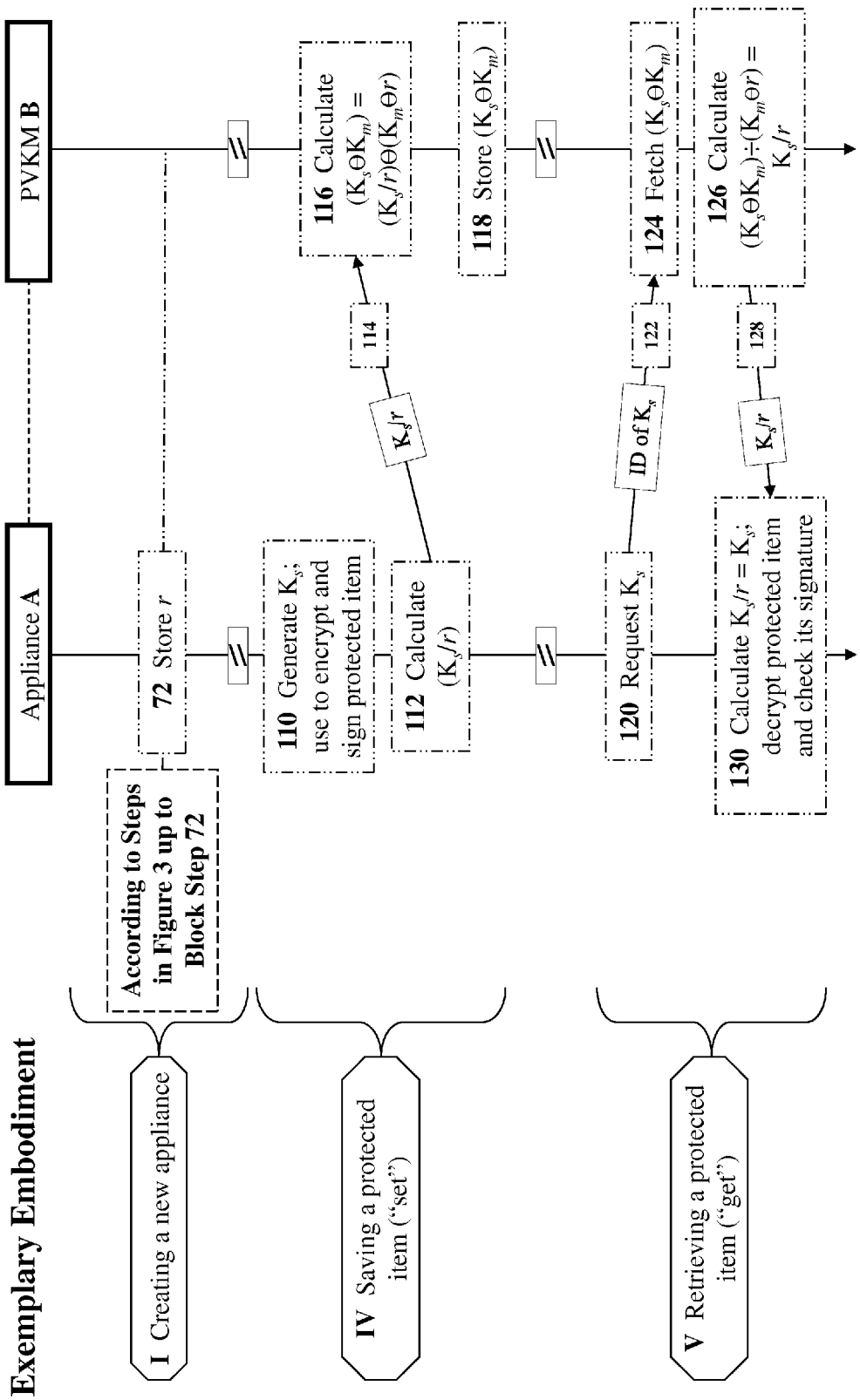
FIG. 5 is a simplified high-level block diagram of the scheme of major operational steps in an exemplary implementation of a homomorphic key encryption protocol utilizing the zero-knowledge proof to provide storage and retrieval for protected items, according to embodiments of the present invention.

Moreover, the overall processes have been classified into sub-processes: a Sub-Process I for creating a new appliance (for FIGS. 1, 2, 3, and 6), a Sub-Process II for creating a new object (for FIG. 4), a Sub-Process III for accessing an existing object (for FIG. 4), a Sub-Process IV for saving a protected item (for FIG. 5), and a Sub-Process V for retrieving a protected item (for FIG. 5).

As stated above, it is desired to generate and use a master key without such keys ever being known (i.e., ever being decrypted) in the computing system. FIG. 1 is a simplified high-level block diagram of the scheme of major operational steps in an exemplary implementation for creating a new appliance in an exemplary implementation of securing keys in a "semi-honest" model, according to the prior art. In such blinded-key embodiments, to create a new appliance (Sub-Process I), PVKM B generates appropriate keys for the encryption $E_k$ (e.g., an ElGamal key-pair ($E_k$, $D_k$) and a generator g (Block Step 10), transmits the public key $E_k$ and g to the user via a client-machine browser for example (Arrow Step 12), and transmits the public key $E_k$ to appliance A (Arrow Step 14) for storing (Block Step 16). The user can use $E_k$ to encrypt $K_m$ before the master key enters the computing system.

A random r is generated, and used to blind $K_m$, via the homomorphic property, by the encryption $E_k$. $K_m \ominus r$ can then be stored on PVKM B, which can retrieve and use $K_m \ominus r$ in subsequent steps (not shown in FIG. 1). The encrypted form of the master key ($E_k(K_m)$) is stored on appliance A (Block Step 18). The blinding value r, used to encrypt and conceal ("blind") the encrypted value of $K_m$ on appliance A, is stored in memory of the appliance A (Block Step 20). The blinding can be applied to the master key without knowing the master key, calculated as $E_k(K_m \ominus r) = E_k(K_m) \ominus E_k(r)$ (Block Step 22), in which ⊖ denotes any appropriate operation. $E_k(K_m \ominus r)$ is then transmitted to PVKM B (Arrow Step 24) for purposes of storage. PVKM B decrypts the encryption $E_k$ (Block Step 26), but due to the random blinding, does not know the master key $K_m$. The result ($K_m \ominus r$) is stored on PVKM B (Block Step 28).

Appliance A needs to use $K_m$ to blind various secrets in later stages. On the other hand, appliance A needs to store $K_m$ in such a way that the value of $K_m$ is not known in the computing system—not to the appliance A, not to any other appliance, not to PVKM B, nor to any other entity in the computing system. Such a process is cryptographically strong; indeed, its security can be proven in the semi-honest model.

While the above protocol protects keys and master keys in the semi-honest model, it is desired to protect keys and master keys in the more stringent malicious model as well. In the more stringent malicious model, it cannot be assumed that the appliance is implemented as specified. It is necessary to prove that an attacker is not able to falsify the value r, and choose some value that is convenient for the attacker's malicious purposes. The more stringent protocol forces the following two criteria.

1) Appliance A is forced to choose a value r, and prove that r is really known to appliance A, while not allowing the value r to be revealed to PVKM B. This implies that r cannot be a simple function of $K_m$ (since $K_m$ is not known to appliance A while r is proven known).
2) Appliance A is forced to prove $E(K_m)$ is being used as required by the protocol, and has not tried to falsify the calculations involving $E(K_m)$ by inserting a different value, while not allowing either appliance A nor PVKM B to ever discover $K_m$.

Such embodiments can be proven to be cryptographically strong when implemented in the more stringent "malicious model" (as detailed below in the section entitled, "Deep Mathematical Analysis of Protocols").

Figure 2:
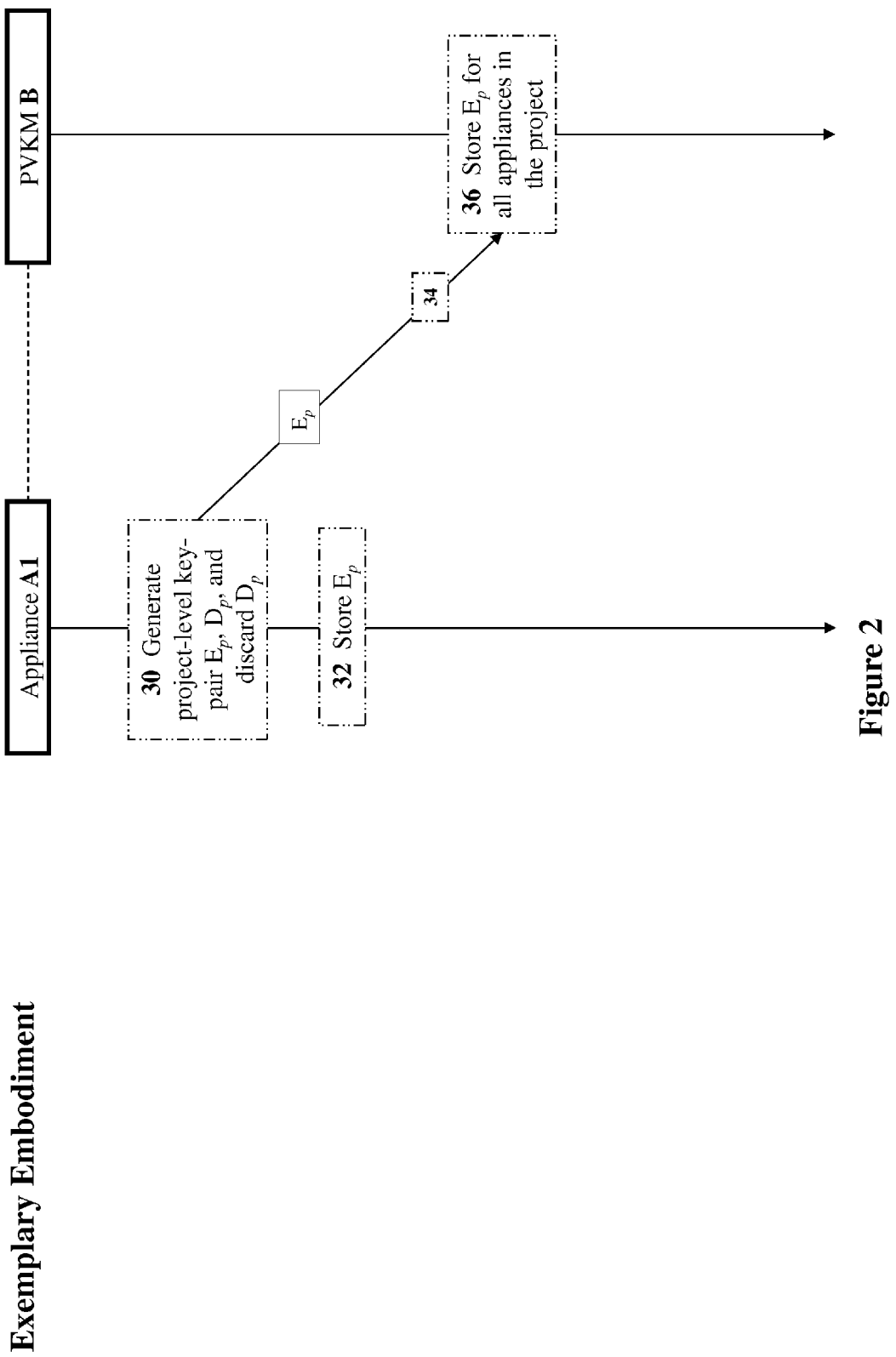
FIG. 2 is a simplified high-level block diagram of the scheme of major operational steps in an exemplary implementation for configuring one-way project-level key-pairs, according to embodiments of the present invention.

FIG. 2 is a simplified high-level block diagram of the scheme of major operational steps in an exemplary implementation for configuring one-way project-level key-pairs, according to embodiments of the present invention. An encryption $E_p$ is introduced which is one way (i.e., cannot be decrypted) and homomorphic. An appliance A1 (i.e., the first appliance in the project only) generates a project-level key-pair $E_p$ and $D_p$, discards $D_p$ (Block Step 30), and stores $E_p$ on appliance A (Block Step 32). $E_p$ is transmitted to PVKM B (Arrow Step 34), and stored on PVKM B for all appliances in the project (i.e., appliances that will be added to the project after appliance A1) (Block Step 36). Such a process can be performed in a slightly different way by having $E_p$ created in the first user's browser (i.e., when the project is first created).

Figure 3:
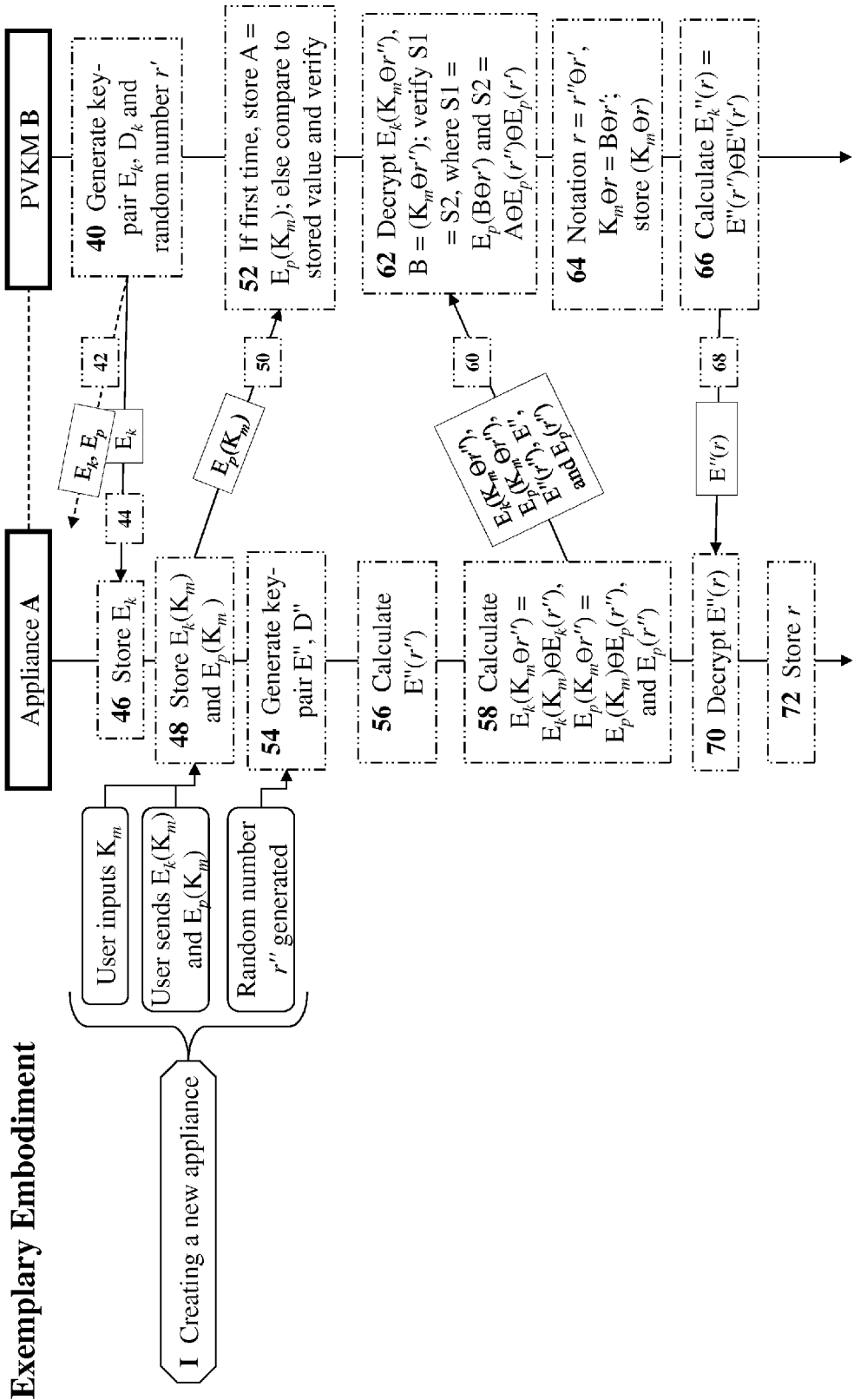
FIG. 3 is a simplified high-level block diagram of the scheme of major operational steps in an exemplary implementation of securing keys in a "malicious" model, according to embodiments of the present invention.

FIG. 3 is a simplified high-level block diagram of the scheme of major operational steps in an exemplary implementation of securing keys in a "malicious" model, according to embodiments of the present invention. The protocol of FIG. 3 utilizes the one-way project-level key-pairs described above with regard to FIG. 2. A new appliance is created (Sub-Process I) by PVKM B generating a key-pair ($E_k$, $D_k$) and a random number r' (Block Step 40), transmits $E_k$ and $E_p$ (as generated in FIG. 2) to the user via a client-machine browser for example (Arrow Step 42), and transmits $E_k$ to appliance A (Arrow Step 44) for storing (Block Step 46). The user uses $E_k$ and $E_p$ to encrypt $K_m$ before the master key enters the computing system.

The encrypted form of the master key ($E_k(K_m)$ and $E_p(K_m)$) is stored on appliance A (Block Step 48). $E_p(K_m)$ is transmitted to PVKM B (Arrow Step 50), which checks if the transmittal is the first instance of the transmittal. If it is the first instance, PVKM B stores $A=E_p(K_m)$. Otherwise, PVKM B compares the transmitted value to the stored value for verification (Block Step 52). A random r" is generated, and used to generate E" and D" on appliance A (Block Step 54), which then calculates E"(r") (Block Step 56), as well as $E_k(K_m \ominus r")=E_k(K_m) \ominus E_k(r")$, $E_p(K_m \ominus r")=E_p(K_m) \ominus E_p(r")$, and $E_p(r")$ (Block Step 58), which are then transmitted to PVKM B (Arrow Step 60).

PVKM B decrypts $E_k(K_m \ominus r")$ (Block Step 62). For $B=(K_m \ominus r")$, PVKM B verifies S1=S2 in which $S1=E_p(B \ominus r')$ and $S2=A \ominus E_p(r") \ominus E_p(r')$. For a defined notation $r=r" \ominus r'$ and $K_m \ominus r = B \ominus r'$, PVKM B stores $K_m \ominus r$ (Block Step 64). PVKM B calculates $E_k"(r)=E"(r") \ominus E"(r')$ (Block Step 66), and transmits E"(r) to appliance A (Arrow Step 68), which decrypts E"(r) (Block Step 70), and stores r (Block Step 72).

The protocol of FIG. 3 achieves criterion 1 above by having PVKM B generate r' and appliance A generate r". PVKM B does not know the final value of $r=r" \ominus r'$, since PVKM B does not know r". Appliance A does not know the value of r' until appliance A commits to a value of r". Appliance A sends over $E_k(K_m \ominus r")$, and PVKM B performs the operation to transform $(K_m \ominus r")$ to $(K_m \ominus r)$. Appliance A cannot "cheat" since PVKM B is needed to store the correct value $(K_m \ominus r)$ for future use (examples of such uses are elaborated on below with regard to FIGS. 4-6), and appliance A does not know r' until it commits to a value of r".

The protocol of FIG. 3 achieves criterion 2 above without revealing the value of $K_m$ by relying on the fact that the encryption $E_p$ cannot be decrypted (since $D_p$ was discarded as described with regard to FIG. 2), and by relying on the homomorphic property of $E_p$. Such a technique is called a "zero-knowledge proof" as the term is used in the art. In effect, the zero-knowledge technique is used to ensure that the protocol is provably secure even in the malicious model—that is, a malicious appliance will not be able to discover $K_m$.

FIG. 4 is a simplified high-level block diagram of the scheme of major operational steps in an exemplary implementation of a homomorphic key encryption protocol utilizing the zero-knowledge proof to provide secure keys for objects, according to embodiments of the present invention. An "object" is defined herein as anything that exists in a computing environment, and needs a key or a secret for its security (e.g., a Binary Large OBject (BLOB), which is a collection of binary data stored as a single entity in a database management system, which needs an encryption key; an administration session that needs an access key; and a communication session that needs a communication encryption key).

The process starts with creating a new appliance (Sub-Process I) according to the steps of FIG. 3 up to Block Step 72 of appliance A storing r (which has been depicted as the initial step in FIG. 4). Optionally, appliance A can gather entropy (as known in the art) in the form of random bits on appliance A (Block Step 80) In creating a new object (Sub-Process II), appliance A requests a new secure, specific key ($K_s$) to be generated (Block Step 82) by transmitting the request to PVKM B, optionally passing on the gathered entropy (Arrow Step 84).

A random number is generated and stored on PVKM B, which essentially is $K_s \ominus K_m$, so $K_s$ is generated only by inference without the value of $K_s$ ever being known to PVKM B (Block Step 86). PVKM B is therefore a key manager that facilitates the generation, storage, and retrieval of secure keys and master keys, while never knowing the values of the keys stored therein—a useful property for a secure key-management system. PVKM B then calculates $(K_s \ominus K_m) \div (K_m \ominus r)=K_s/r$ (Block Step 88), and transmits $K_s/r$ to appliance A (Arrow Step 90), which uses $K_s/r$ to encrypt the object by calculating $(K_s/r) \ominus r = K_s$ (Block Step 92).

In accessing an existing object (Sub-Process III), appliance A requests $K_s$ (Block Step 94) by transmitting a request for the ID of $K_s$ (Arrow Step 96). PVKM B retrieves $K_s \ominus K_m$ (Block Step 98), calculates $(K_s \ominus K_m) \div (K_m \ominus r)=K_s/r$ (Block Step 100), and transmits $K_s/r$ to appliance A (Arrow Step 102), which uses $K_s/r$ to decrypt the object by calculating $(K_s/r) \ominus r = K_s$ (Block Step 104).

The protocol of FIG. 4 generates and uses keys for objects without ever exposing the master key to any entity in the computing system—neither to any appliance, to PVKM B, nor to any other entity in the computing system. It can be called "secure" in the sense that the master key will not be exposed even if the appliance is malicious.

FIG. 5 is a simplified high-level block diagram of the scheme of major operational steps in an exemplary implementation of a homomorphic key encryption protocol utilizing the zero-knowledge proof to provide storage and retrieval for protected items, according to embodiments of the present invention. A "protected item" is defined herein as any secret that one wishes to keep in secure storage, e.g. in the PVKM storage.

The process starts with creating a new appliance (Sub-Process I) according to the steps of FIG. 3 up to Block Step 72 of appliance A storing r (which has been depicted as the initial step in FIG. 5). In saving a protected item (the "set" procedure of Sub-Process II), appliance A generates $K_s$ in order to encrypt and sign the protected item (Block Step 110), calculates $K_s/r$ (Block Step 112), and transmits to PVKM B (Arrow Step 114). PVKM B calculates $(K_s \ominus K_m)=(K_s/r) \ominus (K_m \ominus r)$ (Block Step 116), and stores $K_s \ominus K_m$ (Block Step 118).

In retrieving a protected item (the "get" procedure of Sub-Process II), appliance A requests $K_s$ (Block Step 120) by transmitting a request for the ID of $K_s$ (Arrow Step 122). PVKM B retrieves $K_s \ominus K_m$ (Block Step 124), calculates $(K_s \ominus K_m) \div (K_m \ominus r)=K_s/r$ (Block Step 126), and transmits $K_s/r$ to appliance A (Arrow Step 128), which uses $K_s/r$ to decrypt the protected item and check its signature by calculating $(K_s/r) \ominus r = K_s$ (Block Step 130).

It is noted that the case of FIG. 5 involves a secure encryption key ($K_s$) being generated on appliance A, which encrypts the protected item. This specific key is then saved on PVKM B, without PVKM B ever knowing $K_s$ or $K_m$. The protected item may also be stored on PVKM B (or indeed anywhere else) without PVKM B knowing the value of the protected item—useful properties for the secure storage of secrets.

Figure 6:
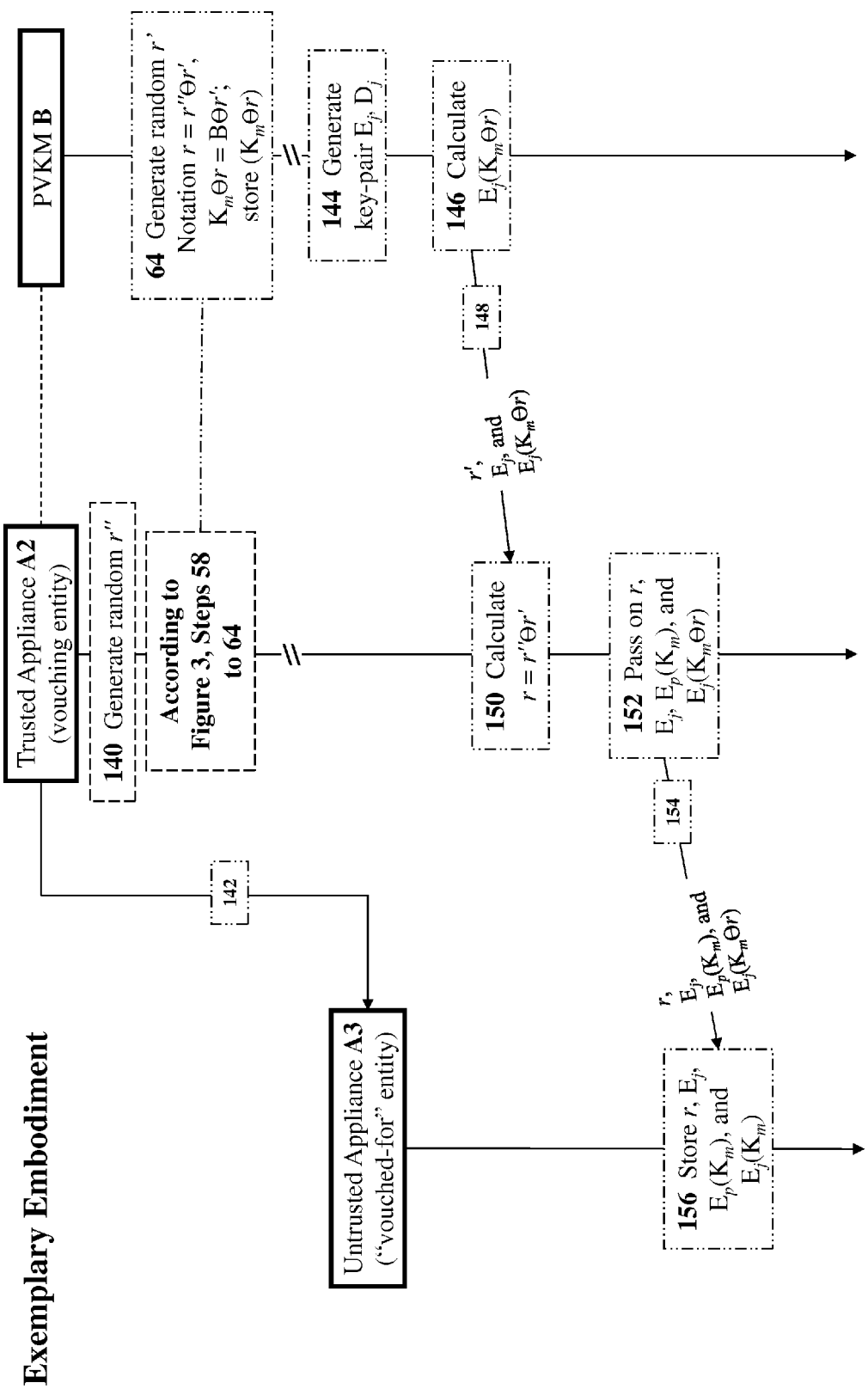
FIG. 6 is a simplified high-level block diagram of the scheme of major operational steps in an exemplary implementation of a homomorphic key encryption protocol utilizing the zero-knowledge proof to create a trusted appliance automatically, according to embodiments of the present invention.

FIG. 6 is a simplified high-level block diagram of the scheme of major operational steps in an exemplary implementation of a homomorphic key encryption protocol utilizing the zero-knowledge proof to create a trusted appliance automatically, according to embodiments of the present invention.

The process starts with creating a new appliance (Sub-Process I) from a signed image, for example; at this stage such a new appliance is untrusted. A random r" is generated (Block Step 140) on a trusted appliance A2, and trusted appliance A2 repeats Steps 58-64 of FIG. 3 of PVKM B storing $K_m \ominus r$ for a defined notation $r=r" \ominus r'$ and $K_m \ominus r = B \ominus r'$ (which has been depicted in FIG. 6). Trusted appliance A2 creates a new appliance (an untrusted appliance A3) from an image that appliance A2 knows to be trustworthy (e.g., a signed image) (Arrow Step 142). As a consequence, trusted appliance A2 serves as a vouching entity for untrusted appliance A3 (the "vouched-for" entity).

PVKM B then generates key-pair $E_j$, $D_j$ (Block Step 144), calculates $E_j(K_m \ominus r)$ (Block Step 146), and transmits r', $E_j$, and $E_j(K_m \ominus r)$ to trusted appliance A2 (Arrow Step 148). Trusted appliance A2 then calculates $r = r'' \ominus r'$ (Block Step 150), and acts as a "pass-through" entity (Block Step 152) by transmitting r, $E_j$, $E_p(K_m)$, and $E_j(K_m \ominus r)$ to untrusted appliance A3 (Arrow Step 154). Untrusted appliance A3 then stores r, $E_j$, $E_p(K_m)$, and $E_j(K_m)$ (Block Step 156), resulting in untrusted appliance A3 becoming a new trusted appliance.

The protocol of FIG. 6 is performed "automatically" in the sense that no user is involved in vouching for the trustworthiness of a new appliance. Instead, trusted appliance A2 vouches for a new appliance (untrusted appliance A3, which is still untrusted when the protocol begins, and ends up trusted if the protocol completes successfully). This contrasts with the protocols discussed above with regard to FIGS. 1 and 3 in which a user was involved in entering the master key, meaning that the user is vouching for a new appliance (i.e., appliance A of FIGS. 1 and 3) by providing the appliance with a master key. With regard to the protocols of FIGS. 1 and 3, the role of establishing trust is essentially left for the user to "manually tell" the system that the particular appliance can be trusted.

The protocol of FIG. 6 starts with a "technical step" in the sense that trusted appliance A2 actually creates the new appliance (untrusted appliance A3) in Block Step 140. For example, in modern virtualization and cloud infrastructure, such a technical step can be achieved by creating the new appliance from a "signed" image. Of course, the trusted appliance must trust the signature of the image before being used.

Trusted appliance A2 and PVKM B then cooperate to provision the new appliance (untrusted appliance A3) with appropriate values that would allow untrusted appliance A3 to participate in similar protocols (e.g., any of the protocols of FIGS. 3-6). Note that in the protocol of FIG. 6, no entity discovers the value of $K_m$, and PVKM B never discovers the random blinding value r. Because of the zero-knowledge proof, r cannot be exploited. Variations of such a protocol can be constructed so that the random blinding value r is also never known on the trusted appliance (i.e., the voucher), if desired.

Deep Mathematical Analysis of Protocols

Through block-diagram embodiments, described above are protocols referred to herein as Homomorphic Key Management (HKM). Additional embodiments are now treated that are open to a rigorous proof of their security. Described below is how the Homomorphic Key Management (HKM) protocol is secured against active attacks assuming the malicious model. Security under the stringent malicious model is achieved by using coin-tossing and honest-verifier zero-knowledge proofs of knowledge of discrete logarithms.

The HKM protocol involves the following three entities:
 The Virtual Key Management (PVKM) service—which runs on the server.
 The Appliance—instantiated by the user and remotely running on the cloud.
 The User—a human who is represented by a distinct client platform (e.g., a Web browser).

The user holds a master key, which is used jointly with the appliance and PVKM key-shares to reconstruct specific keys for data encryption. The role of the PVKM is to assist the appliance in key management without knowing master keys or specific keys, and to enable different instances of the appliance to consistently reconstruct specific keys by combining corresponding key-shares. The specific keys are then used to encrypt various storage objects such as individual files. The protocol's objectives are:
 Preserve secrecy and authenticity of the master and specific keys with respect to the PVKM.
 Preserve secrecy and authenticity of the master and specific keys with respect to an eavesdropper.
 Preserve secrecy and authenticity of the master key with respect to all appliance instances.

The original version of the HKM protocol assumed that the PVKM and appliance are "passive" (also referred to herein as "semi-honest") in the sense that the entities follow the prescribed protocol; whereas, an eavesdropper was allowed to be "active," which means that beyond eavesdropping it could also try to modify and/or omit messages. Security with respect to the PVKM and appliances was achieved by protocol configuration, and security against the active eavesdropper was achieved using standardized tools such as SSL (assuming that a trusted public-key infrastructure is set up and available).

In the active "malicious" model, an additively-homomorphic variant of ElGamal is employed. Specifically, the plain-text space of the encryption is $Z_q$, and a message $m \in Z_q$ is represented by $g^m \in G$. The functionality of the protocol does not require actual knowledge of m (for the purpose of key derivation the value $g^m$ suffices).

In order to achieve a protocol resilient to "active" adversarial behavior of both the PVKM and various appliance instances, a mathematical description of the various modes of operation of the actively-secure HKM protocol, along with corresponding proofs of security, is provided. The proofs are established based on clearly-stated and well-defined assumptions on the setup of the system (such as the extent to which the cloud provider has access to the data used by the appliance, and the extent to which the Javascript code sent by the PVKM to the user in the setup phase is authentic), as well as based on the security of the underlying cryptographic primitives (such as ElGamal encryption and SSL).

The present protocol provides:
 trusted setup phase between the PVKM and user;
 "coin-tossing" protocol between PVKM and appliance; and
 zero-knowledge "compilation" between the PVKM and appliance.

In addition to the use of ElGamal as an encryption scheme, the actively-secure HKM protocol also uses ElGamal as a commitment scheme (in the setup phase between the PVKM and the user). Such a configuration requires in particular the existence of a public-key that was sampled in a way that does not reveal the corresponding secret key to the receiver.

The encoding of plain-texts in the encryption scheme of ElGamal is provided as well. Rather than viewing such encodings as elements in the underlying group, such encodings are viewed as exponents of an appropriately-chosen generator of the group. This allows compatibility between the ElGamal encryption and commitment schemes, as well as opens up the possibility of t-wise independent blinding of the master key.

The implications of the HKM protocol to being secure against active "malicious" adversaries are:
- There is no need to trust the system to have implemented the protocol as specified.
- There is no need to trust the platform on which the appliance is executed to run the appliance as implemented.

The above holds true as long as one of either the PVKM or the appliance runs honestly. In particular, the protocol is configured to detect any deviation from the prescribed behavior (effectively reducing its security to the semi-honest case). It should be noted that the protocol also assumes that a trusted setup phase, in which the Javascript code runs on the User's side (by the PVKM), follows the specification. However, beyond such a trusted setup phase, there is no assumption on the honest behavior of the parties.

The security of the active HKM protocol relies on the semantic security of ElGamal encryption/commitment with key size k=2048, which is a standard and relatively safe assumption. Functionality of the protocol builds on the (multiplicative) homomorphic properties of ElGamal encryption. Such properties hold true unconditionally, and enable the management and derivation of keys in a consistent manner. To make the protocol non-interactive, challenges are generated offline using a "random oracle" (e.g., SHA-1, SHA-2, and SHA-256) in accordance with the Fiat-Shamir paradigm.

Authenticity and secrecy of communication of messages is obtained using SSL, which means that a trusted PKI has to be in place. Again, the assumption that SSL is secure is standard and relatively safe (provided that the implementation is proper).

The ElGamal encryption scheme works as follows. The key-generation algorithm $Gen(1^k)$ generates secret key $sk=x$ and public key $pk=(G,g,h=g^x)$, where g is a randomly chosen generator of a group G of prime order q with $|q|=k$, and x is randomly chosen in $Z_q$. The identity element of G is denoted by $i_G$.

The plain-text space is modified to $Z_q$ as described above, the randomness space is $Z_q$, and the cipher-text space is G. G is required to be a group in which it is easy to determine membership, compute the binary operations, and assume that the parties check that cipher-texts are valid by verifying that the cipher-text is an element in G.

To encrypt a value $m \in G$, the sender picks randomness $r \leftarrow Z_q$ and computes the cipher-text $(c, d)=(g^r, h^r \cdot g^m)$. $Enc_{pk}(m; r)$ denotes the encryption of a value $m \in G$ using randomness r. Note that the cipher-text uniquely determines the value of m. This is because the mapping from $r \in Z_q$ to the values $g^r$ and $h^r$ is injective, and similarly so is the mapping from $m \in Z_q$ to $g^m$. Given a cipher-text $(c, d)$, the receiver can use $sk=x$ in order to compute $d/c=((g^x)^r \cdot g^m)/(g^r)^x=g^m$.

Strictly speaking, computing m from $g^m$ is considered infeasible, since it requires finding the discrete logarithm of $g^m$. However, as mentioned above, this is of no concern in our application, since for the purpose of deriving keys it is sufficient to learn the value of $g^m$ (which is random under the assumption that m is chosen at random).

The security of the ElGamal encryption scheme is equivalent to the Decisional Diffie-Hellman assumption in G, which states that it is infeasible to distinguish triplets of the form $(g^a, g^b, g^{ab})$ from triplets of the form $g^a$, $g^b$, and $g^c$, where a, b, and c are uniformly chosen in $Z_q$. Under this assumption, it can be shown that for any message $m \in G$, the distribution $Enc(m; r)$ of encryptions of m (over a random choice of r) cannot be feasibly distinguished from the distribution of encryptions of a uniformly chosen message $m^0 \in G$.

ElGamal encryption is additively homomorphic (in $Z_q$). For all m, $m^0 \in Z_q$, and r, $r^0 \in Z_q$, $Enc_{pk}(m; r)$ is:

$$Enc_{pk}k(m^0; r^0) = Enc_{pk}(m+m^0; r+r^0),$$

where for c, d, $c^0$, $d^0 \in G$, the value $(c, d)(c^0, d^0)$ is defined as $(c \cdot c^0, d \cdot d^0)$.

The ElGamal encryption scheme can be easily converted into a string commitment scheme for messages $m \in Z_q$. The essential difference between encryption and commitment is that, in the latter case, the receiver is not supposed to be able to decrypt the message m (nor the value $g^m$) by himself, but can do so given "decommitment" information sent by the sender.

To prevent the receiver from learning the secret key, the public key pk can be sampled from a common random string, and it is easy to verify that pk is a valid public key. Alternatively, it is possible to have the sender and receiver jointly sample pk using a coin-tossing protocol. This guarantees that the encryption is semantically secure against both parties, provided that they use a p for which it is possible to generate groups in which the discrete logarithm problem is hard.

Just as in the case of encryption, the message space of the ElGamal commitment is $Z_q$, the randomness space is $Z_q$, and the commitment space is G. G is required to be a group in which it is easy to determine membership, compute the binary operations, and assume that the parties check that commitments are valid by verifying that the commitment is an element in G.

The commitment operation is identical to the encryption operation: to commit to $m \in Z_q$, the sender picks randomness $r \leftarrow Z_q$, and computes the commitment $(c, d)=(g^r, h^r \cdot g^m)$. $Com_{pk}(m; r)$ denotes the commitment of a value $m \in G$ using randomness r. Note that the commitment is perfectly binding (i.e., uniquely determines the value of m). This is because the mapping from $r \in Z_q$ to the values $g^r$ and $h^r$ is injective, and so is the mapping from $m \in Z_q$ to $g^m$. To decommit a commitment $(c, d)$ to a message m, the sender simply sends over the randomness r along with m. The receiver then verifies the equalities: $c=g^r$ and $d/h^r=g^m$.

The hiding property of the ElGamal commitment scheme follows from semantic security of ElGamal encryption. In particular, under the DDH assumption, it can be shown that for any message $m \in Z_q$, the distribution $Com(m; r)$ of commitments of m (over a random r) cannot be feasibly distinguished from the distribution of commitments of a uniformly-chosen message $m^0 \in Z_q$.

Just as with the ElGamal encryption, the ElGamal commitment described above is additively homomorphic (in $Z_q$). Note that knowledge of the secret key $x \in Z_q$, which corresponds to a public key $pk=(G,g,h=g^x)$, enables the receiver to retrieve the value $g^m \in G$ from a commitment $(c, d)=(g^r, h^r \cdot g^m)$. Such a property is useful in the configuration framework of the actively-secure version of the HKM protocol.

There are standard techniques for proving knowledge of the opening to an ElGamal committed value. This can be done in three iterations, costs little in terms of communication and computation, and can be made non-interactive using the Fiat-Shamir transformation.

Given G is a multiplicative group of order q, and given g and h are two generators of G, the input is an ElGamal commitment $(c, d)=(g^r, h^r \cdot g^m) \in G \times G$ to $m \in Z_q$. The "prover" claims that he knows the values of r and m. The following three-move, public coin, perfect SHVZK protocol practically coincides with Schnorr's well-known proof of knowledge of discrete logarithms (see Schnorr, "Efficient Identification and Signatures for Smart Cards," CRYPTO, 1989, pp. 239-252).

---
Protocol Box 1: Proving knowledge of
an opening of an ElGamal commitment.
---
Protocol hP, Vi
Security Parameter: $1^k$
Common input: key ck = (G, g, h), pair (c, d) $\in$ G $\times$ G
Auxiliary inputs to prover: r, m $\in Z_p$ such that c = $g^r$ and d = $h^r \cdot g^m$
P $\rightarrow$ V: Choose s,t $\leftarrow Z_p$ and send (a, b) = ($g^s$, $h^s \cdot g^t$)
V $\rightarrow$ P: Send a random challenge $\alpha \leftarrow Z_q$
P $\rightarrow$ V: Send u = $\alpha \cdot$ r + s and v = $\alpha \cdot$ m + t
V: The verifier accepts if $g^u = c^\alpha \cdot$ a and $h^u = (d^\alpha \cdot$ b)/$g^v$
---

It can be seen that the above protocol is complete. Given a challenge $\alpha$, the prover, knowing s, t, r, and m can compute u=$\alpha$·r+s and v=$\alpha$·m+t. On the other hand, if it is indeed the case that c=$h^r g^m$, the verifier, knowing a, b, c, d, u, v, h, g, and $\alpha$, is able to verify that $g^u$=a·$c^\alpha$ and $h^u$=(b·$d^\alpha$)/$g^v$. The protocol also satisfies special "soundness." Given a pair of accepting answers (u, v) and ($u^0$, $v^0$) to corresponding challenges $\alpha$ and $\alpha^0$, one can recover the values r and m used by the prover as "witnesses."

In addition to the above, the protocol is honest-verifier zero-knowledge. Given a value $\alpha \leftarrow Z_q$, it is possible to generate values a, b, u, and v which are identically distributed (jointly with $\alpha$) to values that would have been chosen by an honest prover in the protocol.

The group in use for both the ElGamal encryption and commitment is G=$QR_p$, the group of quadratic residues mod p, where the prime p and a corresponding generator g are sampled once and for all. The prime p is sampled under the condition that it is of the form 2q+1 for a random prime number q$\in$N of size k=2048. The sampling proceeds by randomly picking numbers $q_i$ until the conditions that "$q_i$ is prime" and "$p_i$=2$q_i$+1 is prime" are both satisfied. A generator g$\in Z^*_p$ of order q is obtained by sampling a random number in $Z^*_p$, squaring it, and testing that the result is not 1. Since q is prime and p=2q+1, this guarantees that the order of g is q, and that g generates G=$QR_p$ (note that the plain-text space is also $QR_p$).

Since p and g are fixed, whenever it is clear from the context, the protocol derivation refrains from explicitly specifying p and g as part of a public key of the ElGamal encryption/commitment. Thus, to specify a public key pk, it is sufficient to provide a single value h=$g^x \in QR_p$. In such a case, the corresponding public key is pk=(G, g, h).

In accordance with the HKDF RFC 5869 key-derivation standard (see Eronen and Krawczyk, "RFC 5869—HMAC-based Extract-and-Expand Key Derivation Function (HKDF)," http://tools.ietf.org/html/rfc5869, 2010), specific keys are derived from elements $S_j \in$G by computing HKDF ($S_j$), which yields a 256-bit pseudo-random string (2048 bits of entropy should be more than sufficient for pseudo-randomness) to be used as a key for AES-256 encryption.

Active versions of the main protocols of the HKM system are: Master-Key Commitment (MKC), New Appliance Instance (NAI), Vouched Appliance Instance (VAI), New Storage Object (NSO), and Set Protected Item (SPI)/Get Protected Item (GPI.

The main protocol, NAI, involves setting up the first instance of the appliance in the project, with the assistance of the user, who holds the master key and the PVKM module, which aids in maintaining state (and specifically the various encryption keys) across different instances. The MKC phase involves interaction between the user, the PVKM, and the first appliance instance. The objective of the MKC phase is to allow the user to send the PVKM a commitment to her master key. The VAI protocol allows for the creation of a new appliance instance that is "vouched" for by a "trusted" appliance instance (i.e., one that has been set up by the NAI protocol). The purpose of the VAI is identical to that of any appliance. However, unlike the case of a trusted appliance instance, there is no requirement to trust its execution.

Another important protocol, NSO, enables the creation of a new specific key to be used to encrypt data (e.g., on a storage device), and allows the PVKM to store a "blinded" version of this specific key for future use. A related protocol, SPI, enables the appliance to generate specific keys "on the fly," and to transmit a "blinded" version to the PVKM. The GPI protocol allows an appliance to retrieve specific keys on demand.

Given n$\in$N denotes the total number of appliance instances, and m$\in$N denotes the total number of specific keys, the security parameter is denoted as k$\in$N. It is assumed that the traffic between the parties is encrypted and authenticated using SSL. It is further assumed that the user possesses a master key, K$\in$G, which is used throughout the life of the system (in particular across different instances) in order to generate, and then reconstruct, specific keys. Capital letters (such as K and $S_j$) are used to denote keys, and letters from the Greek alphabet (such as $\alpha_i$, $\beta_i$, $\gamma_i$, and $\delta_i$) are used to denote "masks" that are used for blinding the keys.

The MKC protocol is in effect a setup phase in which the user commits its master key K$\in$G to the PVKM. This commitment is subsequently used by the PVKM to verify that a given instance of the appliance faithfully follows the protocol. The commitment is required to be hidden from the PVKM. To this end, it is assumed that its public key is sampled in a way that does not allow the PVKM to know its corresponding secret key. It is also assumed that the PVKM does not share this commitment with any other party (most importantly, with any appliance instance).

---
Protocol Box 2: Master-Key Commitment (MKC) Protocol.
---
Protocol (P, U)
Common input: A triplet pk$_{com}$ = (G, g, h$_{com}$), where G = $QR_p$, and g and h$_{com}$ are generators of G.
Auxiliary input to U: Master key K $\in$ G.
U $\rightarrow$ P: Send (c, d) = Com$_{pkcom}$(K; r), where r $\leftarrow Z_q$
P: Output (c, d)
U: Output r
---

Since the user is running JavaScript code that is determined by the PVKM, the correct execution of the setup phase necessitates trusting the PVKM to send the intended code. Without this assumption, the PVKM could simply have the user violate the "hiding" property of the commitment (e.g., by sending the user code that causes it to reveal the master key to the PVKM). The value of r is used subsequently when setting up a NAI, and when vouching for subsequent appliance instances.

To initiate a NAI, the system uses a three-party protocol between the user (denoted as U), the first instance of the appliance (denoted as A), and the PVKM server (denoted as P). The protocol does not require communication between U and P. Its security crucially relies on the following three assumptions.

1) No two of the parties collude.
2) U (invoked by P with JavaScript) follows the protocol's prescribed instructions.
3) The underlying cryptographic primitives (SSL, ElGamal) are secure (in a well-defined sense).

The user U initiates the first appliance instance, A. The appliance is ephemeral and resides in a compute cloud (i.e., a cloud used for computing), such as an Infrastructure-as-a-Service (IAAS) environment. It can be later used to interact with P in order to reconstruct specific keys, $S_j \in G$, even if these keys were generated by other instances of the appliance. It is also used later to spawn subsequent (and untrusted) appliance instances, $A_i$. The way in which the state is maintained between different instances of the appliance is by having U consistently use the same master key K in all instances $A_i$, and by having P store a "masked" version of the specific keys $S_j \cdot K$ (to aid preserving secrecy against the PVKM).

---

Protocol Box 3: New Appliance Instance (NAI) A.

---

Protocol (P, A, U)
Common input: A triplet $pk_{com} = (G, g, h_{com})$, where $G = QR_p$ and g and $h_{com}$ are generators of G.
Auxiliary input to P: A pair (c, d), where c, d ∈ G (commitment to K).
Auxiliary input to U: Master key K ∈ G, value $r \in Z_q$ such that $(c, d) = Com_{pk}(K; r)$.
P → A: Sample sk, γ, s ← $Z_q$:
    Send $h_{enc} = g^{sk}$ (so $pk_{enc} = (G, g, h_{enc})$)
    Send (C, D) = $Com_{pkcom}(γ; s)$ P↔A : Prove knowledge of γ and s
A → U: Send $h_{enc} = g^{sk}$
U → A: Send r and (a, b) = $Enc_{pkenc}(K; t)$, where $t ← Z_q$
A → P: Sample $\tilde{γ} ← Z_q$:
    Compute $(\bar{a}, \bar{b}) = Enc_{pkenc}(\tilde{γ}; 0) = (i_G, i_G \cdot g^{\tilde{γ}})$
    Send (A, B) = (a, b) $(\bar{a}, \bar{b}) = Enc_{pkenc}((K + \tilde{γ}); t) = (g^t, h'_{enc} \cdot g^{K+\tilde{γ}})$
P: Using sk and (c, d):
    Decrypt (A, B) into $g^{K+\tilde{γ}}$
    Compute $(gr, h_{com} \cdot g - g^{\tilde{γ}}) = (c, d) (i_g, i_g \cdot g - (K+\tilde{γ}))$
A↔P: Prove knowledge of $\tilde{γ}$ and r
P → A: Send γ and s
A: Verify that (C, D) = $Com_{pkcom}(γ; s)$
A: Output r and δ = γ + $\tilde{γ}$
P: Output gK+δ = gK+$\tilde{γ}$ · gγ

---

Intuitively, the secrecy of the master key K with respect to A is guaranteed by the assumed security of the ElGamal encryption scheme (note that sk is not known to A). The secrecy of K with respect to P is guaranteed by the fact that the value $\tilde{γ}$ is chosen uniformly at random, and is not known to P (the only value that P learns is $g^{K-\tilde{γ}} = g^K \cdot g^r$) which implies that the "mask" δ=γ+$\tilde{γ}$ is not known to P.

Note that once P learns the pair $(g^r, h_{com}{}^r \cdot g^{-\tilde{γ}})$, it is possible for A to convince P that he knows the values $\tilde{γ}$ and r (which he both possesses). This is done by having both parties compute $(g^{-r}, h^-{}_{com}{}^r \cdot g^{\tilde{γ}})$, and by using the protocol described above. A can perform such computation given $\tilde{γ}$ and r, and P can an perform such computation by inverting the elements ($g^r$ and $h_{com}{}^r \cdot g^{-\tilde{γ}}$) in the group G.

Finally note that A is able to compute δ=γ+$\tilde{γ}$. This is because, by the end of the protocol, A knows both γ (which is sent to A by P) and of $\tilde{γ}$ (which is sampled by A). Also, note that P is able to compute the value of $g^{K+δ}$. This is because P knows both $g^{K+γ}$ (obtained by decrypting (A, B)) and $g^γ$ (since P sampled γ). This "coin-tossing" part, that determines δ, insures that neither A nor P have control over the value of the mask δ. This is in contrast to the semi-honest version of the protocol, which allowed A to control the value of the mask δ (called $γ_i$ in the notation of the previous version), "opening the door" for "man-in-the-middle" attacks by a potentially malicious $A_i$.

The VAI protocol generates a new appliance vouched for by a previously-generated appliance. The protocol requires the active participation of a new appliance instance $A_i$, a previously-initiated appliance instance $A_j$ for j<i (this could either be the first appliance instance or subsequent instances), and of the PVKM P.

---

Protocol Box 4: Vouched Appliance Instance (VAI) $A_i$.

---

Protocol (P, $A_j$, $A_i$)
Common input: A triplet $pk_{com} = (G, g, h_{com})$, where $G = QR_p$, and g and $h_{com}$ are generators of G.
Auxiliary input to P: Blinded key $g^{K+δj}$ and a pair (c, d), where c, d ∈ G (commitment to K).
Auxiliary input to $A_j$: Blinding value $δ_j$ and value $r \in Z_q$ such that (c, d) = $Com_{pk}(K; r)$.
P → $A_i$: Sample $sk_i, γ_i, s_i ← Z_q$:
    Send $h_i = g^{sk_i}$ (so $pk_i = (G, g, h_i)$)
    Send (C, D) = $Com_{pkcom}(γ_i; s_i)$
P↔$A_i$: Prove knowledge of $γ_i$ and $s_i$
$A_j$ → $A_i$: Send r and $(a_i, b_i) = Enc_{pki}(-δ_j; t_i)$ where $t_i ← Z_q$
$A_j$↔$A_i$: Prove knowledge of $δ_j$ and $t_j$
$A_i$ → P: Sample $\tilde{γ}_i, ← Z_q$:
    Compute $(\bar{a}_i, \bar{b}_i) = Enc_{pki}(\tilde{y}_i; 0) = (i_G, i_G \cdot g^{\tilde{γ}_i})$
    Send $(A_i, B_i) = (a_i, b_i)(\bar{a}_i, \bar{b}_i) = Enc_{pki}((\tilde{γ}_i - δ_j); t_i) = (g^{ti}, h^{ti}_i \cdot g^{\tilde{γ}_i - δj})$
P: Using sk, $g^{K+δj}$, and (c, d):
    Decrypt $(A_i, B_i)$ into $g^{\tilde{γ}_i - δj}$
    Compute $gK + \tilde{γ}_i = gK+δj \cdot g\tilde{γ}_i-δj$
    Compute $(g^r, h_{com}{}^r \cdot g - g^{\tilde{γ}_i}) = (c, d) (i_g, i_g \cdot g - (K + \tilde{γ}_i))$
$A_i$↔P: Prove knowledge of $\tilde{γ}_i$ and r
P → A: Send $γ_i$ and $s_i$
A: Verify that $(C_i, D_i) = Com_{pkcom}(γ_i; s_i)$
$A_i$: Output r and $δ_i = γ_i + \tilde{γ}_i$ P : Output $gK+δi = gK+\tilde{γ}_i \cdot gγi$

---

As in the case of the NAI protocol, once P learns the pair $(g^r, h_{com}{}^r \cdot g^{-\tilde{γ}})$, it is possible for $A_i$ to convince P that he knows the values $\tilde{γ}_i$ and r (which he both possesses). This is done by having both parties compute $(g^{-r}, h_{com}{}^r \cdot g^{\tilde{γ}_i})$, and by using the protocol described above. $A_i$ can perform such computation given $\tilde{γ}_i$ and r, and P can perform such computation by inverting the elements ($g^r$ and $h_{com}{}^r \cdot g^{-\tilde{γ}_i}$) in the group G.

Also note that $A_i$ is able to compute $δ_i = γ_i + \tilde{γ}_i$. This is because, by the end of the protocol, $A_i$ knows both $γ_i$ (which is sent by P) and $\tilde{γ}_i$ (which is sampled by $A_i$). Also note that P is able to compute $g^{K+δ_i}$. This is because P knows both $g^{K+\tilde{γ}_i}$ (obtained by decrypting $(A_i, B_i)$) and $g^{γi}$ (since P sampled $γ_i$).

For the NSO protocol, once an "instance-specific" masking $g^{K+δ_i} = g^K \cdot g^{δ_i}$ of the master key K has been set up, such a masking can be used to protect specific keys, $S_j$, for encrypting storage objects. This is done by having $A_i$ interact with the PVKM (which stores "blinded" versions of the specific keys). The main challenge here is to guarantee that the $j^{th}$ specific key $S_j$ could also be accessed by subsequent (and totally unrelated) instances of the appliance.

---

Protocol Box 5: New Storage Object (NSO) - Generating specific key $S_j$ via P.

---

Protocol (P, $A_i$)
Auxiliary input to P: $g^{K+δi}$
Auxiliary input to $A_i$: $δ_i$
$A_i$ → P: Request to generate $j^{th}$ specific key
P → $A_i$: Sample $α_j ← Z_q$ and send $g^{βij} = g^{αj}/g^{K+δi}$
$A_i$: Output $S_j = g^{βij} \cdot g^{δi} = g^{αj}/gK$
P: Output $g^{αj} = g^K \cdot S_j$

---

The string $S_j$ output by $A_i$ is by definition the $j^{th}$ specific key $S_j$. Since the value $\alpha_j$ that is locally stored by P satisfies $g^{\alpha_j}=g^K\cdot S_j$, and since $g^K$ is random and secret with respect to P (it is only known by U), presumably $S_j$ is secret with respect to P.

However, it should be noted that this secrecy is not perfect, as P will eventually hold an entire sequence $g^K\cdot S_1$, $g^K\cdot S_2, \ldots, g^K\cdot S_m$ of specific keys that are "blinded" using the same master key K. This in particular means that P can potentially infer various relations between the keys (such as the ratio $S_j/S_{j^0}$ for j, j°), and "opens the door" for related key attacks. This is in practice mitigated by applying a "random oracle" to the keys. Specifically, the actual data-encryption keys are derived from $S_j$'s use of the HKDF function (see Eronen and Krawczyk cited above), which is assumed to behave as a random oracle.

In the SPI protocol, the appliance $A_i$ will want in some cases to generate a specific key, $S_j$, "on the fly." After having generated the key, the appliance transmits the key ("blinded" with the master key K) to the PVKM for future use. The SPI protocol proceeds as follows.

---

Protocol Box 6: Set Protected Item (SPI) -
Generating specific key $S_j$ via $A_i$.

---

Protocol (P, $A_i$)
Auxiliary input to P: $g^{K+\delta_i}$
Auxiliary input to $A_i$: $\delta_i$
$A_i \rightarrow$ P: Sample $S_j \leftarrow$ G. Send $g\beta_{ij} = S_j/g^{\delta_i}$
P: Output $g_{\alpha j} = g\beta_{ij} \cdot gK + \delta_i$
$A_i$: Output $S_j$

---

As before, the string $S_j$ output by $A_i$ is, by definition, the $j^{th}$ specific key $S_j$. Since the value $g^{\alpha_j}$ that is locally stored by P equals $g^K\cdot S_j$, and since $g^K$ is random and secret with respect to P (it is only known by U), presumably $S_j$ is secret with respect to P. However, as in the previous case, secrecy is not perfect due to the various relations between the keys.

In the GPI protocol, the $i^{th}$ instance of the Appliance, $A_i$, can retrieve the $j^{th}$ specific key, $S_j$, on demand for decrypting storage objects. This is done by having $A_i$ interact with the PVKM (which stores "blinded" versions of the specific keys).

---

Protocol Box 7: Get Protected Item (GPI) -
Retrieving specific key $S_j$ via P.

---

Protocol (P, $A_i$)
Auxiliary input to P: $g^{\alpha j}$ and $g^{K+\delta_i}$
Auxiliary input to $A_i$: $\delta_i$
$A_i \rightarrow$ P: Request to retrieve $j^{th}$ specific key
P $\rightarrow A_i$: Send $g\beta_{ij} = g_{\alpha j}/gK+\delta_i$
$A_i$: Output $S_j = g\beta_{ij} \cdot g\delta_i = g_{\alpha j}/gK$

---

Employing t-wise independent blinding, one can strengthen the protection against related key attacks by having the master key be a degree-t polynomial $K(x)=\Sigma^t_{i=0} k_i x^i$. Then, the specific keys $S_j$ are blinded with $g^{K(j)}$. The main observation is that it is possible to homomorphically evaluate the encryption of $g^{K(j)}$ given j and encryptions of $g^{k0}, g^{k1}, \ldots, g^{kt}$. This is because $g^{K(j)}$ equals g raised to the power of $\Sigma^t_{i=0} k_i j^i$, which equals:

$\Pi_{i=1}^t$ of $((g^{k_i})$ raised to the power of $j^i)$.

The benefit of blinding with a degree-t polynomial K(x) is that the distribution $K(1), \ldots, K(m)$ is t-wise independent. This means that P is not be able to infer relations amongst any subset of t-specific keys, $S_{j1}, \ldots, S_{jt}$. Thus, the complexity of P mounting a related key attack is significantly increased (since P could only rely on relations between t+1 and more keys, thereby mitigating relations between any t or less keys). In practice, taking t=2 should suffice, since related-key attacks usually rely on binary relations amongst the keys.

While the present invention has been described with respect to a limited number of embodiments, it will be appreciated that many variations, modifications, and other applications of the present invention may be made.

What is claimed is:

1. A method for securing keys when key-management processes are subverted by an adversary, the method comprising the steps of:
   (a) upon receiving a creation request in the computing-environment, creating a secure key in at least one location in a computing environment by repetitively computing respective secure-key contributions:
      (i) in said at least one location; and
      (ii) in a set of N computing resources in said computing environment, wherein N is a non-negative integer, and wherein said set includes all computing resources in said computing environment; and
   (b) applying said respective secure-key contributions to change a secure-key value, wherein:
      (i) said respective secure-key contributions cannot be omitted or modified by said at least one location; and
      (ii) said secure key is never revealed in unencrypted form to any of said computing resources;
      thereby enabling said computing resources in the computing environment to
      ensure that said secure key is random;
   wherein said at least one location is a region of memory located in a given computing resource of said set, operationally connected to said computing-environment.

2. The method of claim 1, wherein said respective secure-key contributions are random.

3. The method of claim 1, wherein said respective secure-key contributions of said set of N computing resources are never revealed to said at least one location.

4. The method of claim 1, wherein a given, respective secure-key contribution of a given computing resource is never revealed to any other computing resource of said set of N computing resources, and wherein said secure-key in said at least one location is never revealed to any other computing resource of said set of N computing resources.

5. The method of claim 1, wherein said step of creating and said step of applying said respective secure-key contributions can be performed on any element of a collection of computing resources operationally connected to the computing-environment, and wherein said step of applying is performed differently on each said element, thereby preventing subversion of one said element from compromising any other said element.

6. A device for securing keys when key-management processes are subverted by an adversary, the device comprising:
   (a) a server including:
      (i) a CPU for performing computational operations;
      (ii) a memory module for storing data; and
      (iii) a network connection for communicating across a network; and
   (b) a protection module, residing on said server, configured for:
      (i) upon receiving a creation request in the computing-environment, creating a secure key in at least one location in a computing environment by repetitively computing respective secure-key contributions:
         (A) in said at least one location; and
         (B) in a set of N computing resources in said computing environment, wherein N is a non-negative integer, and wherein said set includes all computing resources in said computing environment; and
(ii) applying said respective secure-key contributions to change a secure-key value, wherein:
(A) said respective secure-key contributions cannot be omitted or modified by said at least one location; and
(B) said secure key is never revealed in unencrypted form to any of said computing resources;
thereby enabling said computing resources in the computing environment to ensure that said secure key is random;
wherein said at least one location is a region of memory located in a given computing resource of said set, operationally connected to said computing-environment.

7. The device of claim 6, wherein said respective secure-key contributions are random.

8. The device of claim 6, wherein said respective secure-key contributions of said set of N computing resources are never revealed to said at least one location.

9. The device of claim 6, wherein a given, respective secure-key contribution of a given computing resource is never revealed to any other computing resource of said set of N computing resources, and wherein said secure-key in said at least one location is never revealed to any other computing resource of said set of N computing resources.

10. The device of claim 6, wherein said creating and said applying said respective secure-key contributions can be performed on any element of a collection of computing resources operationally connected to the computing-environment, and wherein said applying is performed differently on each said element, thereby preventing subversion of one said element from compromising any other said element.

11. A non-transitory computer-readable medium, having computer-readable code embodied on the non-transitory computer-readable medium for securing keys when key-management processes are subverted by an adversary, the computer-readable code comprising:
(a) program code for, upon receiving a creation request in the computing-environment, creating a secure key in at least one location in a computing environment by repetitively computing respective secure-key contributions:
(i) in said at least one location; and
(ii) in a set of N computing resources in said computing environment, wherein N is a non-negative integer, and wherein said set includes all computing resources in said computing environment; and
(b) program code for, applying said respective secure-key contributions to change a secure-key value, wherein:
(i) said respective secure-key contributions cannot be omitted or modified by said at least one location; and
(ii) said secure key is never revealed in unencrypted form to any of said computing resources;
thereby enabling said computing resources in the computing environment to ensure that said secure key is random;
wherein said at least one location is a region of memory located in a given computing resource of said set, operationally connected to said computing-environment.

12. The non-transitory computer-readable medium of claim 11, wherein said respective secure-key contributions are random.

13. The non-transitory computer-readable medium of claim 11, wherein said respective secure-key contributions of said set of N computing resources are never revealed to said at least one location.

14. The non-transitory computer-readable medium of claim 11, wherein a given, respective secure-key contribution of a given computing resource is never revealed to any other computing resource of said set of N computing resources, and wherein said secure-key in said at least one location is never revealed to any other computing resource of said set of N computing resources.

15. The non-transitory computer-readable medium of claim 11, wherein said creating and said applying said respective secure-key contributions can be performed on any element of a collection of computing resources operationally connected to the computing-environment, and wherein said applying is performed differently on each said element, thereby preventing subversion of one said element from compromising any other said element.

* * * * *